(12) United States Patent
Deole et al.

(10) Patent No.: US 11,042,613 B2
(45) Date of Patent: Jun. 22, 2021

(54) ENHANCED USER AUTHENTICATION BASED ON DEVICE USAGE CHARACTERISTICS FOR INTERACTIONS USING BLOCKCHAINS

(71) Applicant: Avaya Inc., Santa Clara, CA (US)

(72) Inventors: Pushkar Yashavant Deole, Pune (IN); John Alexander Young, Buntingford (GB)

(73) Assignee: Avaya Inc., Santa Clara, CA (US)

( * ) Notice: Subject to any disclaimer, the term of this patent is extended or adjusted under 35 U.S.C. 154(b) by 93 days.

(21) Appl. No.: 16/175,537

(22) Filed: Oct. 30, 2018

(65) Prior Publication Data

US 2020/0134143 A1  Apr. 30, 2020

(51) Int. Cl.
*G06F 21/31* (2013.01)
*H04L 29/06* (2006.01)
*H04L 9/06* (2006.01)

(52) U.S. Cl.
CPC .......... *G06F 21/316* (2013.01); *H04L 9/0637* (2013.01); *H04L 63/08* (2013.01); *H04L 2209/38* (2013.01)

(58) Field of Classification Search
CPC ......... G06F 21/316; G06F 21/64; H04L 63/08
See application file for complete search history.

(56) References Cited

U.S. PATENT DOCUMENTS

| 9,514,293 | B1* | 12/2016 | Moritz | H04L 63/102 |
| 10,432,605 | B1* | 10/2019 | Lester | H04L 63/20 |
| 2015/0347204 | A1* | 12/2015 | Stanley-Marbell | A61B 5/7275 719/318 |
| 2018/0343175 | A1* | 11/2018 | Bathen | H04L 67/10 |
| 2019/0243980 | A1* | 8/2019 | Inamdar | G06F 21/606 |
| 2019/0354607 | A1* | 11/2019 | Snow | H04L 67/22 |

OTHER PUBLICATIONS

Rosenberg et al. "SIP: Session Initiation Protocol," The Internet Society, Network Working Group, Jun. 2002, RFC 3261, 269 pages.

* cited by examiner

*Primary Examiner* — Ali S Abyaneh
(74) *Attorney, Agent, or Firm* — Sheridan Ross P.C.

(57) ABSTRACT

A first set of device usage characteristics of a first user interaction with a user communication device are received. For example, a device usage characteristic may be an average key pressure, a used WiFi access point, an install date of an application, an angle of a user communication device, etc. The first set of device usage characteristics of the first user interaction are compared to a second set of device usage characteristics of a second user interaction with the user communication device that is stored in a blockchain. One or more reason codes that identifies why the first and second compared sets of device usage characteristics do not match is generated in response to the first and second compared sets of device usage characteristics not matching. The one or more reason codes are used for identifying a level of trust of a user in a communication session.

18 Claims, 6 Drawing Sheets

ENHANCED USER AUTHENTICATION BASED ON DEVICE USAGE CHARACTERISTICS FOR INTERACTIONS USING BLOCKCHAINS

FIELD

The disclosure relates generally to user authentication systems and particularly to authentication systems that authenticate a user in a communication session.

BACKGROUND

About a decade ago, customers were required to personally visit the bank in order to do most of the banking transactions. Fast forward to today, the technology has advanced so much that a customer can do almost all the banking transactions virtually from anywhere in the world, through the use of on-line banking or through mobile/phone banking services. These services have made life a lot easier for the customers; however, at the same time it has also given rise to the cybercrime and fraud. There are security measures available today such as passwords, security codes, authentication tokens or even biometrics, which a customer could use to authenticate himself/herself before doing a transaction through net banking or phone/mobile banking. The customer is then able to avail the services provided by the bank. For example, a customer makes a call or initiates a chat using his/her smartphone to the bank's customer service center and is asked for a security code along with certain Personal Identifiable Information (PII) by the customer service center. Upon a successful provision of which the customer can avail the mobile banking services provided by the bank.

However, looking at the rate at which the cyber frauds are increasing day by day, the traditional methods of security are certainly inadequate and there is a need to apply additional security measures with multifactor authentication methods involving a multitude of user identity factors, which are more secure than traditional passwords/security codes.

SUMMARY

These and other needs are addressed by the various embodiments and configurations of the present disclosure. A first set device usage characteristics of a first user interaction with a user communication device are received. For example, a device usage characteristic may be an average key pressure, a used WiFi access point, an install date of an application, an angle of a user communication device, etc. The first set of device usage characteristics of the first user interaction with the user communication device are compared to a second set of device usage characteristics of a second user interaction with the user communication device that is stored in a blockchain. One or more reason codes that identifies why the first and second compared sets of device usage codes do not match is generated in response to the first and second compared sets of device usage characteristics not matching. The one or more reason codes are used for identifying a level of trust of a user in a communication session.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "Session Initiation Protocol" (SIP) as used herein refers to an IETF-defined signaling protocol, widely used for controlling multimedia communication sessions such as voice and video calls over Internet Protocol (IP). The protocol can be used for creating, modifying and terminating two-party (unicast) or multiparty (multicast) sessions consisting of one or several media streams. The modification can involve changing addresses or ports, inviting more participants, and adding or deleting media streams. Other feasible application examples include video conferencing, streaming multimedia distribution, instant messaging, presence information, file transfer and online games. SIP is as described in RFC 3261, available from the Internet Engineering Task Force (IETF) Network Working Group, November 2000; this document and all other SIP RFCs describing SIP are hereby incorporated by reference in their entirety for all that they teach.

The term "blockchain" as described herein and in the claims refers to a growing list of records, called blocks, which are linked using cryptography. The blockchain is commonly a decentralized, distributed and public digital ledger that is used to record transactions across many computers so that the record cannot be altered retroactively without the alteration of all subsequent blocks and the consensus of the network. Each block contains a cryptographic hash of the previous block, a timestamp, and transaction data (generally represented as a merkle tree root hash). For use as a distributed ledger, a blockchain is typically managed by a peer-to-peer network collectively adhering to a protocol for inter-node communication and validating new blocks. Once recorded, the data in any given block cannot be altered retroactively without alteration of all subsequent blocks, which requires consensus of the network majority. In verifying or validating a block in the blockchain, a hashcash (or other algorithm) algorithm generally requires the following parameters: a service string, a nonce, and a counter. The service string can be encoded in the block header data structure, and include a version field, the hash of the previous block, the root hash of the merkle tree of all transactions (or information or data) in the block, the current time, and the difficulty level. The nonce can be stored in an extrallonce field, which is stored as the left most leaf node in the merkle tree. The counter parameter is often small at 32-bits so each time it wraps the extrallonce field must be incremented (or otherwise changed) to avoid repeating work. When validating or verifying a block, the hashcash algorithm repeatedly hashes the block header while incrementing the counter & extrallonce fields. Incrementing the extrallonce field entails recomputing the merkle tree, as the transaction or other information is the left most leaf node. The body of the block contains the transactions or other information. These are hashed only indirectly through the Merkle root.

The term "distributed ledger" as described herein and in the claims comprises a plurality of separate digital ledgers that are stored on different network elements, such as, on separate servers, on separate communication managers, in separate databases and/or on separate network elements, on separate devices, and/or the like. The separate ledgers may reside on different types of network elements. For example, the distributed ledger may reside on a communication manager and a database on another network element, such as a router.

The term "device usage characteristic" as described herein and in the claims may include various types of device usage characteristics, such as, a preferred user hand of a user, a number of fingers used by the user in typing, an average key pressure, an average key pressure range, a location, a language setting, a WiFi access point, an install date of an authentication application, an install date of one or more other applications, an application usage parameter, a cadence between keystrokes, an amount of spelling errors, types of emoji used, an average numbers of emoji's used, a swipe text usage, local region settings, a sim card identifier, a user location pattern (e.g., where the user is likely at a location during a time period), web site interaction time, a device angle, a device height from the ground, a connection with a smart watch, a time period of movement of the a user communication device, and/or the like. In addition, a device usage characteristic may be a hashed device usage characteristic, an encrypted device usage characteristic, and/or the like.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

DETAILED DESCRIPTION

Figure 1:
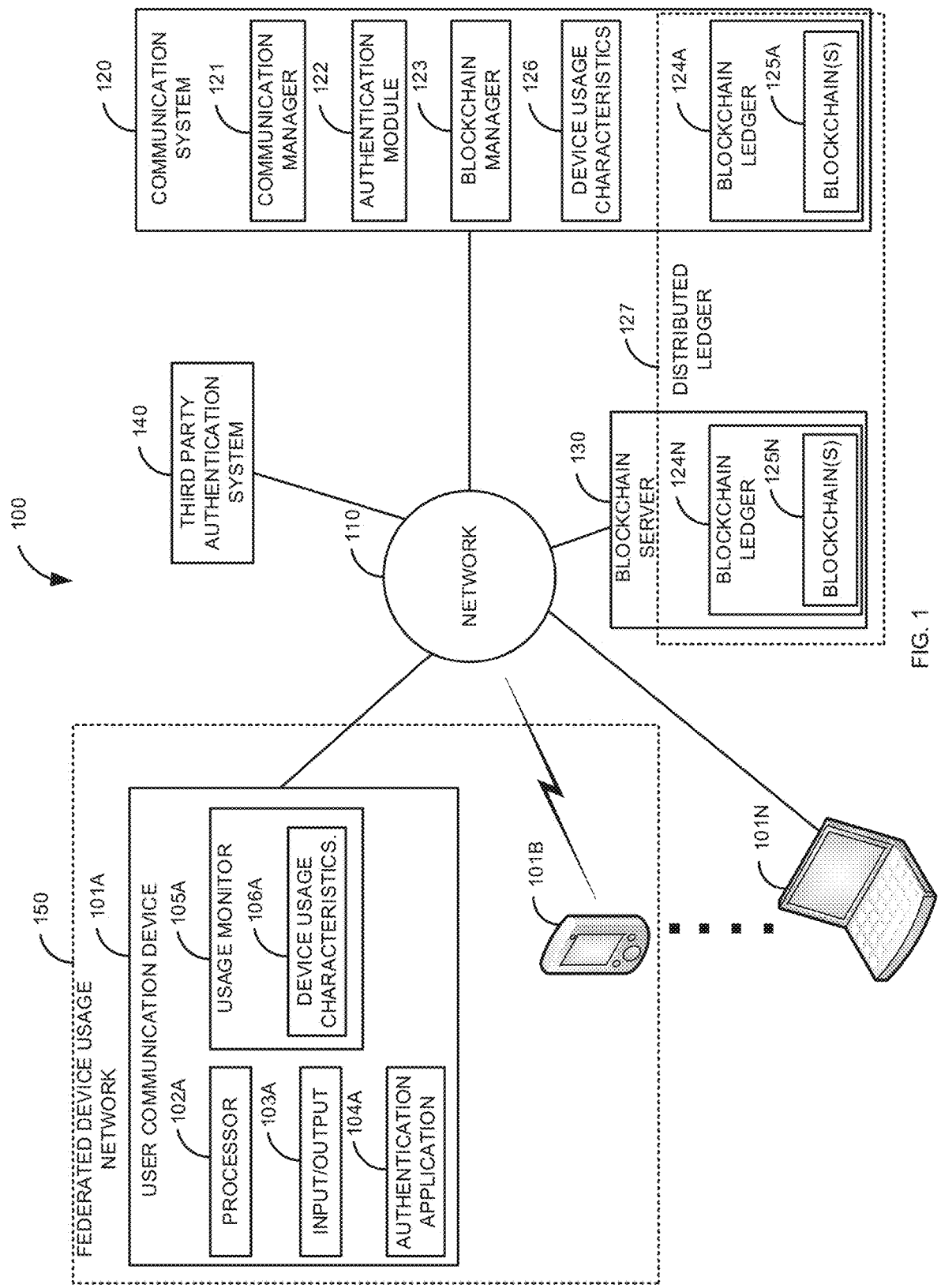
FIG. 1 is a block diagram of a first illustrative system for authenticating a user in a communication session using authentication metrics and device usage characteristics.

FIG. 1 is a block diagram of a first illustrative system 100 for authenticating a user in a communication session using authentication metrics and device usage characteristics 106/126. The first illustrative system 100 comprises user communication devices 101A-101N, a network 110, a communication system 120, a blockchain server 130, a third party authentication system 140, and a federated device usage network 150.

The user communication devices 101A-101N can be or may include any user communication device 101 that can communicate on the network 110, such as a Personal Computer (PC), a telephone, a video system, a cellular telephone, a Personal Digital Assistant (PDA), a tablet device, a notebook device, a smartphone, and/or the like. As shown in FIG. 1, any number of user communication devices 101A-101N may be connected to the network 110, including only a single user communication device 101. In one embodiment, some of the user communication devices 101A-101N may be used by contact center agents in a contact center.

The user communication device 101A further comprise a processor 102A, input/output 103A, an authentication application 104A, and a usage monitor 105A. The processor 102A can be or may include any hardware processor, such as a microprocessor, a multi-core processor, a microcontroller, an application specific processor, a digital signaling processor, and/or the like.

The input/output 103A can be or may include any hardware element that allows a user to input and receive information from the user communication device 101A, such as, a microphone, a speaker, a touchscreen, a display, an accelerometer, a keyboard, a mouse, a trackball, a lamp, a button, a scanner, a sensor, and/or the like.

The authentication application 104A can be or may include any software/firmware that can authenticate a user. The authentication application 104A may work in conjunction with the third party authentication system 140 and/or the authentication module 122. The authentication application 104A may receive information, such as, a user name, a password, a digital certificate, one or more biometrics, and/or the like. The authentication application 104A may be a web application provided by a web server.

The usage monitor 105A monitors a user interaction with the user communication device 101A. The usage monitor 105 may monitor/determine various device usage characteristics 106A, such as, a preferred user hand of a user (i.e., the user is right handed), a number of fingers used by the user in typing (e.g., on a smartphone), an average key pressure, an average key pressure range, a location of the user communication device 101A, a language setting of the user, a WiFi access point used by the user communication device 101A, an install date of the authentication application 104A, an install date of one or more other applications, an application usage parameter (e.g., how often the user accesses an application), a cadence between keystrokes, an amount of spelling errors made over time, types of emoji used by the user, an average numbers of emoji's used by the user (e.g., per text message), a swipe text usage, local region settings, a sim card identifier, a location pattern (e.g., a pattern of movement, for example at work during the week), web site interaction time (e.g., how long a user typically interacts with a specific web site), a device angle (e.g., an angle that the user holds the user communication device 101A), a device height from the ground, a connection with a smart watch, a time period of movement of the user communication device 101A, and/or the like.

Although not shown for convenience, the user communication devices 101B-101N may also comprise each of the elements 102-106. For example, (although not shown for convenience) the user communication device 101B may comprise a corresponding processor 102B, input/output 103B, authentication application 104B, usage monitor 105B, and device usage characteristic(s) 106B.

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of electronic protocols, such as Ethernet, Internet Protocol (IP), Session Initiation Protocol (SIP), Integrated Services Digital Network (ISDN), and the like. Thus, the network 110 is an electronic communication network configured to carry messages via packets and/or circuit switched communications.

The communication system 120 can be or may include any hardware system coupled with firmware/software that can manage communication sessions between the user communication devices 101A-101N, such as a Private Branch Exchange (PBX), a router, a proxy server, a central office switch, a contact center, and/or the like. The communication system 120 further comprises a communication manager 121, an authentication module 122, a blockchain manager 123, a blockchain ledger 124A, blockchain(s) 125A, and device usage characteristics 126.

The communication manager 121 can be or may include any hardware (i.e., a processor 102) coupled with firmware/software that can manage and help establish communication sessions on the network 110, such as, a PBX, a session manager, a router, a proxy server, and/or the like. The communication manager 121 can manage various types of communication sessions, such as voice, video, multimedia (a type of video), virtual reality (a type of video), gaming (a type of video), Instant Messaging (IM), email, a text messaging, and/or the like.

The authentication module 122 can be or may include any firmware/software that can be used to authenticate a user/user communication device 101. The authentication module 122 may authenticate a user/user communication device 101 in various ways, such as by using a user name/password, by using one or more biometrics, by using device usage characteristics 106/126, and/or the like.

The blockchain manager 123 can be or may include any firmware/software that can manage blockchain(s) 125 either individually and/or in a distributed ledger 127. In one embodiment, the blockchain manager 123 may reside external to the communication system 120 or may be distributed. For example, the blockchain manager 123 may be distributed between the communication system 120 and the blockchain server 130.

The blockchain ledgers 124A-124N can be or may include any database/storage that can store one or more blockchains 125A-125N for a user/communication session. The blockchain ledger 124A is part of a distributed ledger 127. The distributed ledger 127 comprises the blockchain ledgers 124A-124N. The blockchain ledgers 124A-124N are in essence copies of each other. This allows verification if one blockchain 125A-125N becomes compromised or corrupted. The distributed ledger 127 can be used to restore a blockchain ledger 124 if the device that has the ledger fails. As shown in FIG. 1, the blockchain ledgers 124A-124N may comprise from two to N (where N is an integer) number of separate blockchain ledgers 124.

In one embodiment, the blockchain ledger 124A may have different user access privileges than the blockchain ledger 124N. For example, if there are only two blockchain ledgers (124A and 124N), each of the blockchain ledgers 124A and 124N can be controlled by separate administrators. This prevents a single administrator from being able to change both blockchain ledgers 124A-124N to try and delete a blockchain 125 in a blockchain ledger 124.

The blockchain ledger 124A further comprises one or more blockchain(s) 125A. An individual blockchain 125 is typically associated with individual user, one or more communication sessions of the user, and one or more user communication devices 101 that are owned or assigned to the user. The information regarding number of communication sessions and user communication devices 101 in the blockchain(s) 125 may change over time. In one embodiment, there is a single blockchain 125 that is used for all users/communication sessions/device usage characteristics.

The device usage characteristics 126 can be or may include any characteristics that are based on a user interaction with a user communication device 101. The device usage characteristics 106/126 can be or may include how a user interacts with various elements (e.g., input/output 103) in a user communication device 101, such as, a camera, a microphone, a touchscreen, a keyboard, a virtual keyboard, a button, a menu, an area of a display, a window, an accelerometer, a sensor, and/or the like. The device usage characteristics 126 may include copies of device usage characteristics (e.g., 106A, 106B, etc.) from individual ones of the user communication devices 101A-101N.

The blockchain server 130 is any server/network element that can store the blockchain ledger 124N. As discussed above, the blockchain ledger 124N is a copy of the blockchain ledger 124A.

The third party authentication system 140 can be or may include any system that can authenticate a user on behalf of another party. The third party authentication system 140 may be used to authenticate a user using a username/password, a digital certificate, one or more biometrics, and/or the like on behalf of the communication system 120 (e.g., a contact center).

The federated device usage network 150 is a network of user communication devices 101A-101B that are owned/controlled by an individual user. The federated device usage network 150 is a grouping of user communication devices 101A-101B that have been bound to an authenticated user. For example the user may authenticate (e.g., by providing biometrics) when first using the communication devices 101A-101B. The authentication process binds the user to the user communication devices 101A-101B to each other as part of the federated device usage network 150. The federated device network 150 is formed by a peer discovery process by each authentication application 104 in each user communication device 101 owned by the user. The authentication application 104 on each user communication device 101 launches a discovery process that may be triggered at a specific time of day or may be triggered manually by the user. The authentication module 104 uses the user's established identity key and broadcasts discovery events within the vicinity to discover peer user communication devices 101. Since the user's identity is used as a key for encryption/decryption, the peer discovery process could identify other peers in the network using the key.

Figure 2:
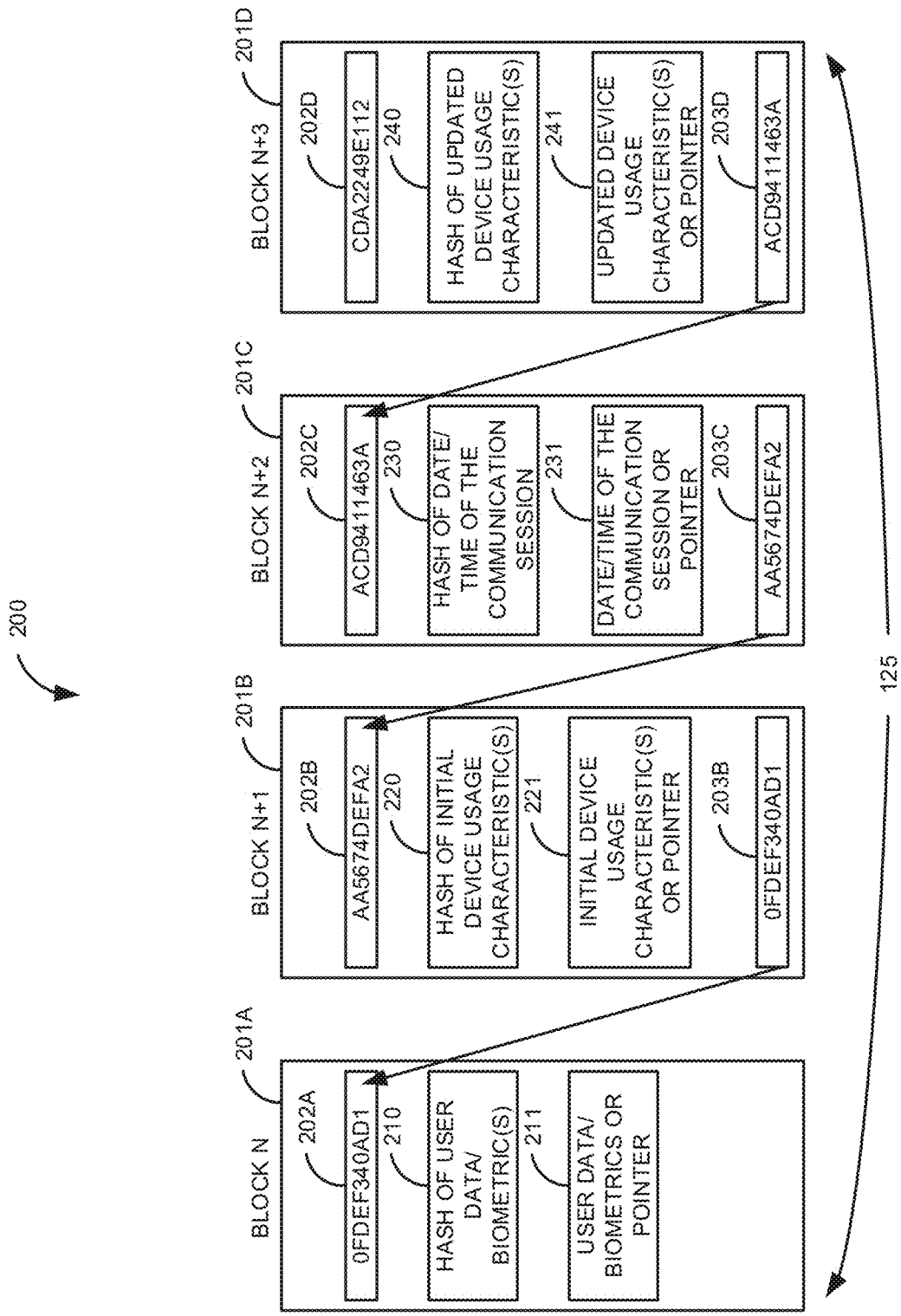
FIG. 2 is a diagram of how a blockchain is initially created and added to with additional blocks.

FIG. 2 is a diagram of how a blockchain 125 is initially created and added to with additional blocks 201. The blockchain 125 comprises blocks N-N+3 (201A-201D). In this example, block 201A is the initial bock 201A. Blocks 201B, 201C, and 20D are then added over time to the blockchain 125.

The blockchain 125 is created when the block 201A is initially added. The block 201A is optionally added when user data/biometric data is received for a user. The block 201A comprises a head pointer 202A, a hash of user data/biometric(s) 210, and user data/biometric(s) or pointer to the user data/biometric(s) 211. The head pointer 202A is an initial head pointer of a linked list. The tail pointer 203B points to the head pointer 202A to link the block 201B to the block 201A. This type of linking allows blocks 201 to be linked together when new blocks 201 are added to the blockchain 125.

The hash of user data/biometrics 210 may be defined in various ways. The hash of user data/biometrics 210 may comprise a group of hashes of individual user data/biometrics. For example, if the user data comprised a user name and a password, and the biometrics comprises a retinal scan and fingerprint, there may be four individual hashes for each element. Alternatively, there may be a single hash that covers the four individual elements. In addition, groups of elements may be hashed. For example, the user name and password may be hashed and the retinal scan and fingerprint can be hashed.

In one embodiment the user data/biometrics 211 may be in the block 201A. Alternatively, a pointer 211 may be used that points to a location where the user data/biometrics are stored. For example, the pointer 211 may point to the third party authentication system 140. The bock 201A does not have a tail pointer 203 like the blocks 201B-201D because the block 201A is the initial block 201A.

The block 201B is added to the blockchain 125 based on the usage monitor 105 initially monitoring how a validated user interacts with the user communication device 101. The usage monitor 105 may identify various device usage characteristics 106. For example, the usage monitor 105 may identify that the user is right handed, an average key pressure of the user, a language setting of the user, and used WiFi access point(s) used by the user communication device 101. The usage monitor 105 sends the device usage characteristics 106 to the blockchain manager 123. The blockchain manager 123 then adds the block 201B to the blockchain 125.

The block 201B comprises a head pointer 202B, a hash of initial device usage characteristic(s) 220, the initial device usage characteristic(s) or pointer 221, and a tail pointer 203B. The tail pointer 203C points to the head pointer 202B to link the block 201C to the block 201B.

The hash of initial device usage characteristic(s) 220 may be defined in various ways. The hash of initial usage characteristic(s) 220 may comprise a group of hashes of individual device usage characteristics 106/126. For example if the device usage characteristics 106/126 identify that the user is right handed, an average key pressure of the user, a language setting of the user, and used WiFi access point(s) used by the user communication device 101, there would be four individual hashes in the hash of initial device usage characteristic(s) 106/206. Alternatively, the hash of the initial device usage characteristic(s) 220 may be a single hash over all four elements or any combination of hashes.

The initial device usage characteristic(s) or pointer 221 may be the initial device usage characteristics 106/126 or a pointer that points to a location where the initial device usage characteristics 106/126 reside. For example, a pointer 221 may point to the device usage characteristics 126 located on the communication system 120.

The block 201C is added to the blockchain 125 based on a communication session that the user communication device 101 has either established (e.g., between the user communication device 101A and a contact center agent) or attempted to establish. For example, the user may attempt to establish a communication session from the user communication device 101A to the user communication device 101N by using a banking application (e.g., which is an agent communication device in a contact center).

The block 201C comprises a head pointer 202C, a hash of date/time of the communication session 230, a date/time of the communication session or pointer 231, and a tail pointer 203C. The tail pointer 203D points to the head pointer 202C to link the block 201D to the block 201C. The hash of the date/time of the communication session 230 is typically a single hash. However, in one embodiment, there may be a separate hash of the date and a separate hash of the time.

The date/time of the communication session or pointer 231 may be the actual date/time (e.g., Aug. 13, 2018 @ 9:30 AM MST). Alternatively, a pointer 231 may be used that points to a location of where the date/time of the communication session is stored.

In one embodiment, the block 201C may include additional information about the communication session, such as, a type (e.g., voice, video, Instant Messaging (IM), multimedia, gaming, virtual reality, text messaging, email, etc.), participants, and/or the like. A hash of this information would be part of the hash of the date/time of the communization session 230. In addition, this information would be part of the date/time of the communication session or pointer 231.

The block 201D is added to the blockchain 125 based on the device usage characteristic(s) 106/126 changing over time. For example, if the device usage characteristic 106/126 is swipe text usage (e.g., the user uses a swipe application to send text messages), as the user becomes more efficient over time using the swipe application, the device usage characteristics 106/126 may need to be updated in the blockchain 125. If the device usage characteristics 106/126 are updated in the blockchain 125, the most recent device usage characters 106/126 are used.

The block 201D comprises a head pointer 202D, a hash of updated device usage characteristic(s) 240, updated device usage characteristic(s) or pointer 241, and a tail pointer 203D. The hash of updated devices usage characteristics 240 are a hash of the updated device usage characteristics 106/126. The updated device usage characteristic(s) or pointer 241 are the updated device usage characteristics 106/126 or a pointer to where the updated device usage characteristics 106/126 reside.

In one embodiment, the block 201A is not part of the blockchain 125. In this embodiment, the initial block 201B is the first block 201 in the blockchain 125.

Figure 3:
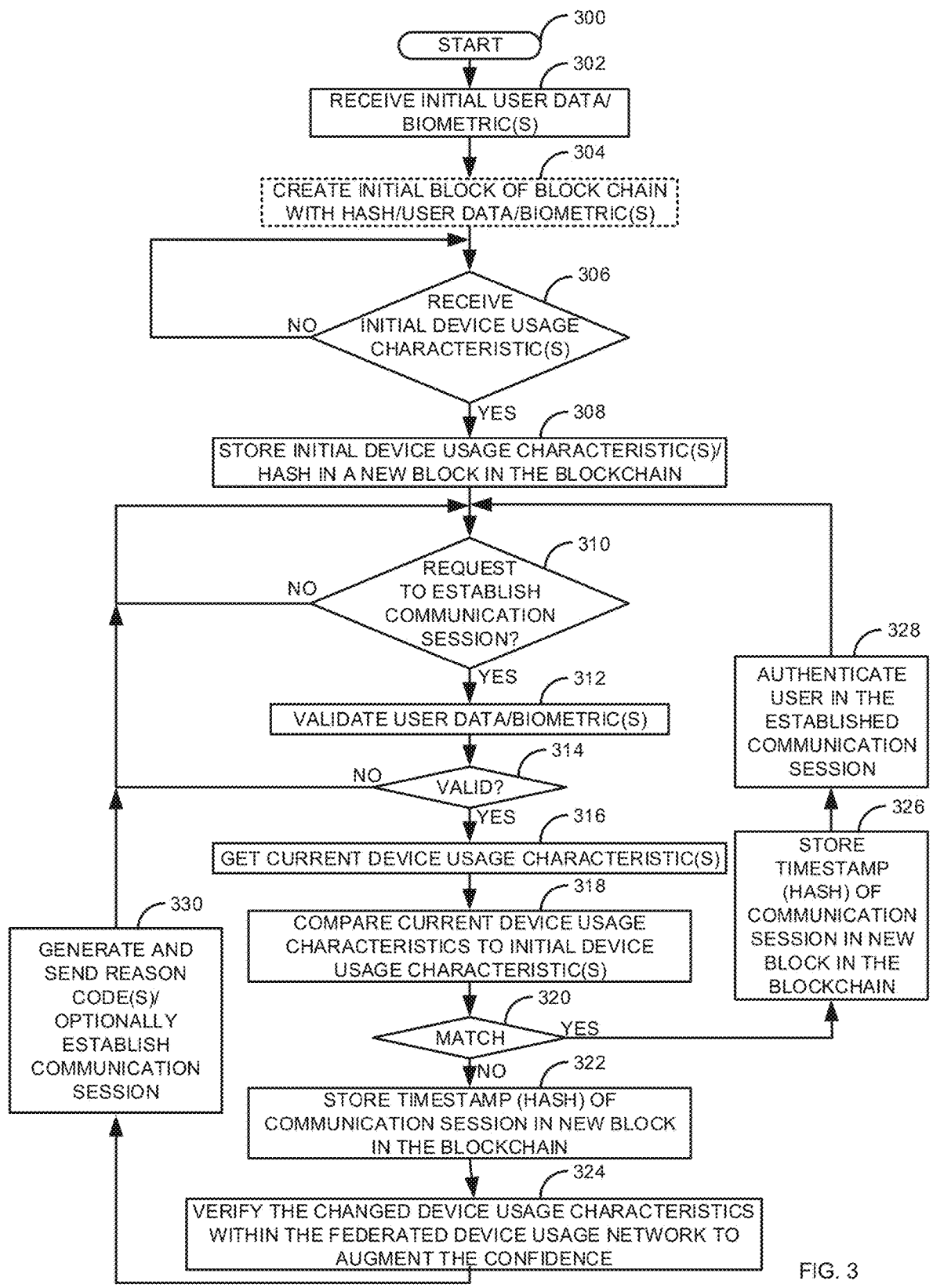
FIG. 3 is a flow diagram of a process for authenticating a user on a first user communication device in a first user communication session using authentication metrics and device usage characteristics of the first user communication device.

FIG. 3 is a flow diagram of a process for authenticating a user on a first user communication device 101 in a first communication session authentication metrics and using device usage characteristics 106/126 of the first user communication device 101. Illustratively, the user communication devices 101A-101N, the input/output 103, the authentication application 104, the usage monitor 105, the communication system 120, the communication manager 121, the authentication module 122, the blockchain manager 123, the blockchain server 130, and the third party authentication system 140 are stored-program-controlled entities, such as a computer or microprocessor, which performs the method of FIGS. 2-6 and the processes described herein by executing program instructions stored in a computer readable storage medium, such as a memory (i.e., a computer memory, a hard disk, and/or the like). Although the methods described in FIGS. 2-6 are shown in a specific order, one of skill in the art would recognize that the steps in FIGS. 2-6 may be implemented in different orders and/or be implemented in a multi-threaded environment. Moreover, various steps may be omitted or added based on implementation.

The process starts in step 300. The authentication application 104A and/or the third party authentication system 140 receives the user data/biometrics in step 302. For example, the third party authentication system 140 may verify the user, user data (e.g., name, address, etc.) and get the biometrics (e.g., facial, fingerprint, retinal scan, voiceprint, etc.). Alternatively, the authentication application 104A may receive the user data/biometrics. In one embodiment, the user data/biometrics are sent to the authentication module 122.

The blockchain 125 is optionally created (indicated by the dotted lines), in step 304, with the initial block 201A as described in FIG. 2. For example, the blockchain manager 123 creates the blockchain 125A in the blockchain ledger 124A. The blockchain 124A is then copied to the blockchain ledger 124N in the blockchain server 130 as part of the distributed ledger 127. Steps 300-304 may be implemented as a separate thread/process from the rest of FIG. 3.

The blockchain manager 123 waits, in step 306, to receive the initial device usage characteristic(s) 106A from the usage manager 105A. If the initial device usage characteristic(s) 106A are not received in step 306, the process of step 306 repeats. Otherwise, if the initial device usage characteristics 106A are received in step 306, the blockchain manager 123 stores, in step 308, the initial device usage characteristics 106A/hash in the block 201B as described in FIG. 2. Steps 306-308 may also be implemented as a separate thread/process. The device usage characteristics 106A may also be stored in the device usage characteristics 126.

The communication manager 121 waits, in step 310, for a request to establish a communication session. For example, a user of the user communication device 101A may try to establish a voice call to a contact center using a mobile banking application. Although described for an outgoing call, the request to establish the communication session of step 310 may be for an incoming call to the user communication device 101A. If a request to establish a communication session is not received in step 310, the process of step 310 repeats. Otherwise, if a request to establish a communication session is received in step 310, the one or more of the authentication application 104, the third party authentication system 140, and the authentication module 122 validates the user data (e.g., a user name/password) and the biometric(s) (e.g., facial recognition/voiceprint) in step 312. If the user data/biometrics are not valid in step 314, the process goes back to step 310.

Otherwise, if the user data/biometric(s) are valid in step 314, the blockchain manager 123 gets the current device usage characteristics 106A/126 in step 316. For example, in one embodiment, the request to establish the communication session of step 310 may have the authentication score and reason codes that are derived by the third party authentication system 140 and are directly provided as part of a SIP INVITE message. The blockchain manager 123 compares the initial device usage characteristic(s) (221) or compares hash of the initial device usage characteristic(s) 220 of the blockchain 125 to the current device characteristic(s) 106A/126 or hash of the current device characteristic(s) in step 318. In one embodiment, the current device usage characteristics 106 may be compared to device usage characteristics 106 of other user communication devices 101 in the federated device usage network 150 in order to generate reason codes with enhanced confidence.

If there is a match in step 320, the blockchain manager 123 stores, step 326, the time stamp/hash of the communication in the block 201C in the blockchain 125 as discussed in FIG. 2. The user is authenticated in the established communication session in step 326. For example, if the communication session is with a contact center, the authentication module 122 can confirm to the contact center or contact center agent (via a communication device of the contact center agent) that the user is authentic. The process then goes back to step 310.

If there is not a match in step 310 the authentication module 122 can calculate an authentic score for the user based on how much the device usage characteristics 106/126 vary. For example the authentic score may have the following levels on a scale of 1-10:

0-4—Low score range
5-8—Medium score range
9-10—High score range (10 being a perfect match).

The levels may be an overall level or based on an individual device usage characteristic 106A/126. For example, if the user was previously right handed and is now left handed, the handedness score would be in the low range (i.e., 0). If the an average key pressure of the user is only 80% (a 20% variance) of what it used to be, the score for key pressure of the user would be for example, 8 based on the 20% variance. If the language setting stayed the same (e.g., English), the language setting score would be 10. If a new WiFi access point is being used by the user communication device 101, the access point score may be low (e.g., 0).

The timestamp/hash of the communication session is stored, in step 322, in the block 201C in the blockchain 125 as discussed in FIG. 2. The changed device usage characteristics 106 are verified (optionally) within the federated device usage network 150 to augment the confidence of the user of the communication device 101 in step 324. For example, if the authentic score is a low score, this is propagated to the other user communication devices 101 owned/controlled by the user (e.g., in a message) and verified against the aggregate score of the federated device usage network 150.

One or more reason codes are generated and sent in step 330. For example, the one or more reason codes (along with variances) may be sent to a contact center in step 330. Using the above, example, a reason code for handedness (using the wrong hand), a reason code for key pressure (20% variance), and a reason code for WiFi access point (new WiFi access point) are sent in step 330. The process then goes back to step 310. In one embodiment, the reason codes will be used by a contact center (the communication system 120) to execute certain rules and make critical business decisions that allows the transaction or deny the transaction and passes it onto a fraud department. In this example, the contact center agent may ask the user if they are at home (e.g., using a known WiFi access point). If the user says they are at home, the contact center agent will know that the user is not authentic.

Based on the variances and/or reason codes, the communication session is optionally established in step 330. For example, if there is enough variance (e.g., in an overall score), the communication session may be blocked. The reason codes/variances may be used to report that the user communication device 101 may have become compromised. For example, the user communication device 101 may have been stolen and is now being used by a different user who is trying to impersonate the owner of the user communication device 101. The process then goes back to step 310.

In one embodiment, where the user has not been initially authenticated, a user (e.g., a contact center agent) may, upon demand, request that the user/device usage characteristics 106 be verified (e.g., given an authentic score) as described in FIG. 3. In addition, the contact center agent may demand that the user provide personally identifiable information that would further identify/authenticate the user.

The processes of FIG. 3 are described where the primary processes (e.g., those implemented by the authentication module 122 and the blockchain manager 123) are implemented on the communication system 120. However, in another embodiment, the authentication module 122, the blockchain manager 123, the blockchain ledger 124 may all reside in the user communication device 101A. For example, in a peer-to-peer system.

Figure 4:
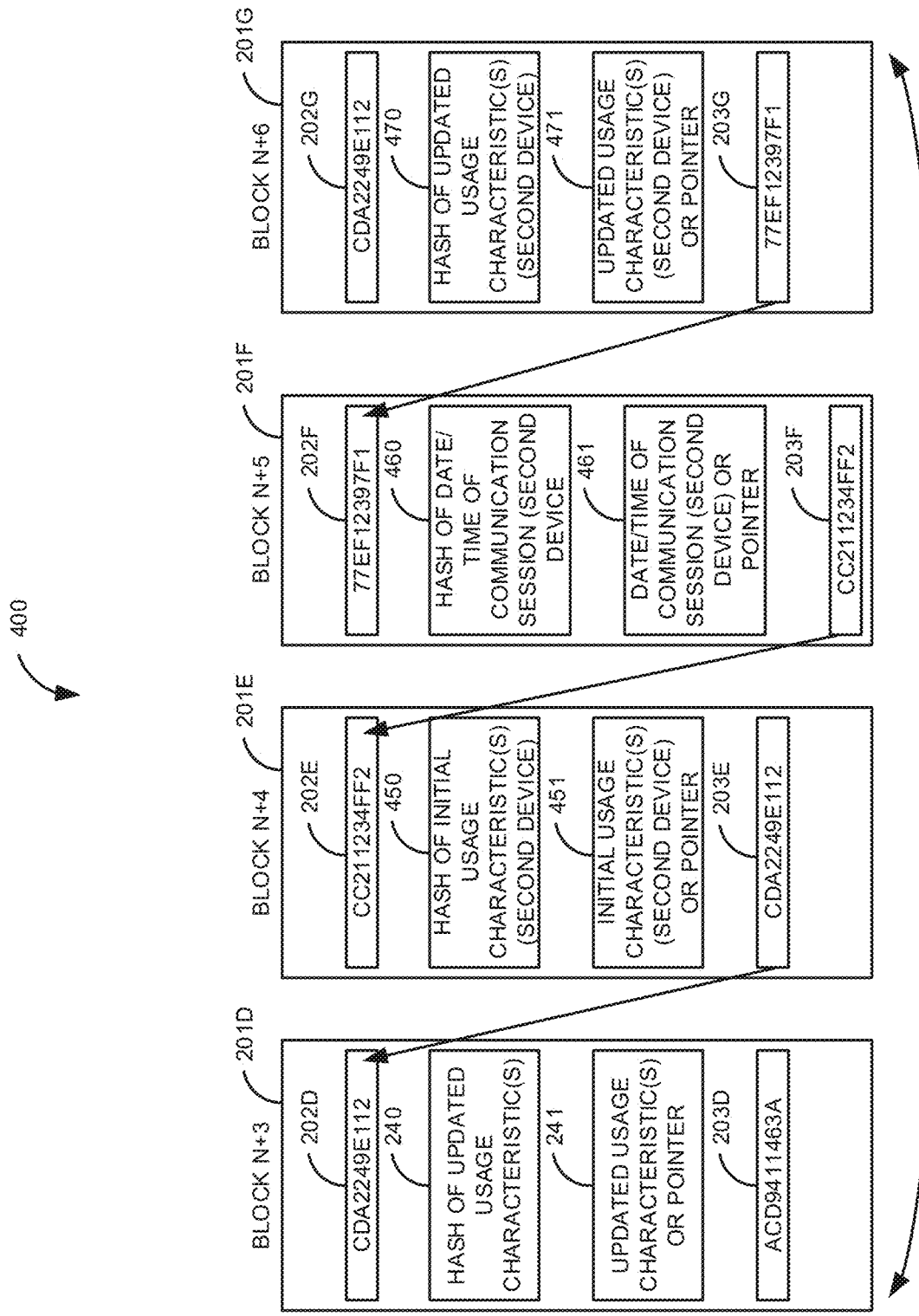
FIG. 4 is a diagram of a blockchain that uses multiple user communication devices.

FIG. 4 is a diagram of a blockchain 125 that uses multiple user communication devices 101. For example, the user may own the user communication devices 101A (e.g., a tablet device) and 101B (a smartphone). The blockchain 125 of FIG. 4 comprises the blocks 201D-201G. The blocks 201E-201G are blocks that are added to the blockchain 125 based on a second user communication device (e.g., 101B) of the user. The process described in FIG. 4 will work for any number of user communication devices 101 associated with the user.

The block 201D was previously described in FIG. 2. The block 201E comprises a head pointer 202E, a hash of initial device usage characteristic(s) 450 for the second user communication device 101B, the initial device usage characteristic(s) for the second user communication device or pointer 451, and a tail pointer 203E. The tail pointer 203E points to the head pointer 202D to link the block 201E to the block 201D.

The process described in FIG. 4 is based on an exemplary embodiment where the user communication device 101B is the second user communication device 101B. As mentioned above, the user communication device 101B may have the same elements (i.e., an authentication application 104B, usage monitor 105B, and device usage characteristics 106B).

When the same user is verified as using the user communication device 101B (i.e., by the authentication application 104B/third party authentication system 140/authentication module 122) the usage monitor 105B identifies the initial usage characteristics 106B. The initial usage characteristics of the second user communication device or pointer 451/hash of the initial usage characteristic(s) for the second user communication device 450 are written into the block 201E in a similar manner as described for block 201B of FIG. 2. The tail pointer 203E points to the head pointer 202D of the block 201D. Likewise, the tail pointer 203F points to the head pointer 202E.

When a user tries to initiate a communication session using the user communication device 101B, block 201F (which includes the head pointer 202F, the hash of date/time of the communication with the second user communication device 460, the date/time of the communication session or pointer 461, and the tail pointer 203F) is added to the blockchain 125 in a similar manner as block 201C of FIG. 2.

Likewise, when the device usage characteristic(s) 106B need to be updated for the user communication device 101B, block 201G is added (including the head pointer 202G, the hash of updated usage characteristic(s) for the user communication device 470, the updated usage characteristic(s) for the user communication device or pointer 471, and the tail pointer 203G) to the blockchain 125 in a similar manner as block 201D.

The blockchain 125 described in FIGS. 2 and 4 are where there are separate blockchains 125 for each user/user communication devices 101 associated with the user. However, in another embodiment, there may be a single blockchain 125 for all users/user communication devices 101A-101N. Whenever a transaction occurs for any user/user communication device 101 (e.g., communication session/updated usage characteristics) a new block 201 is added to the single blockchain 125.

Figure 5:
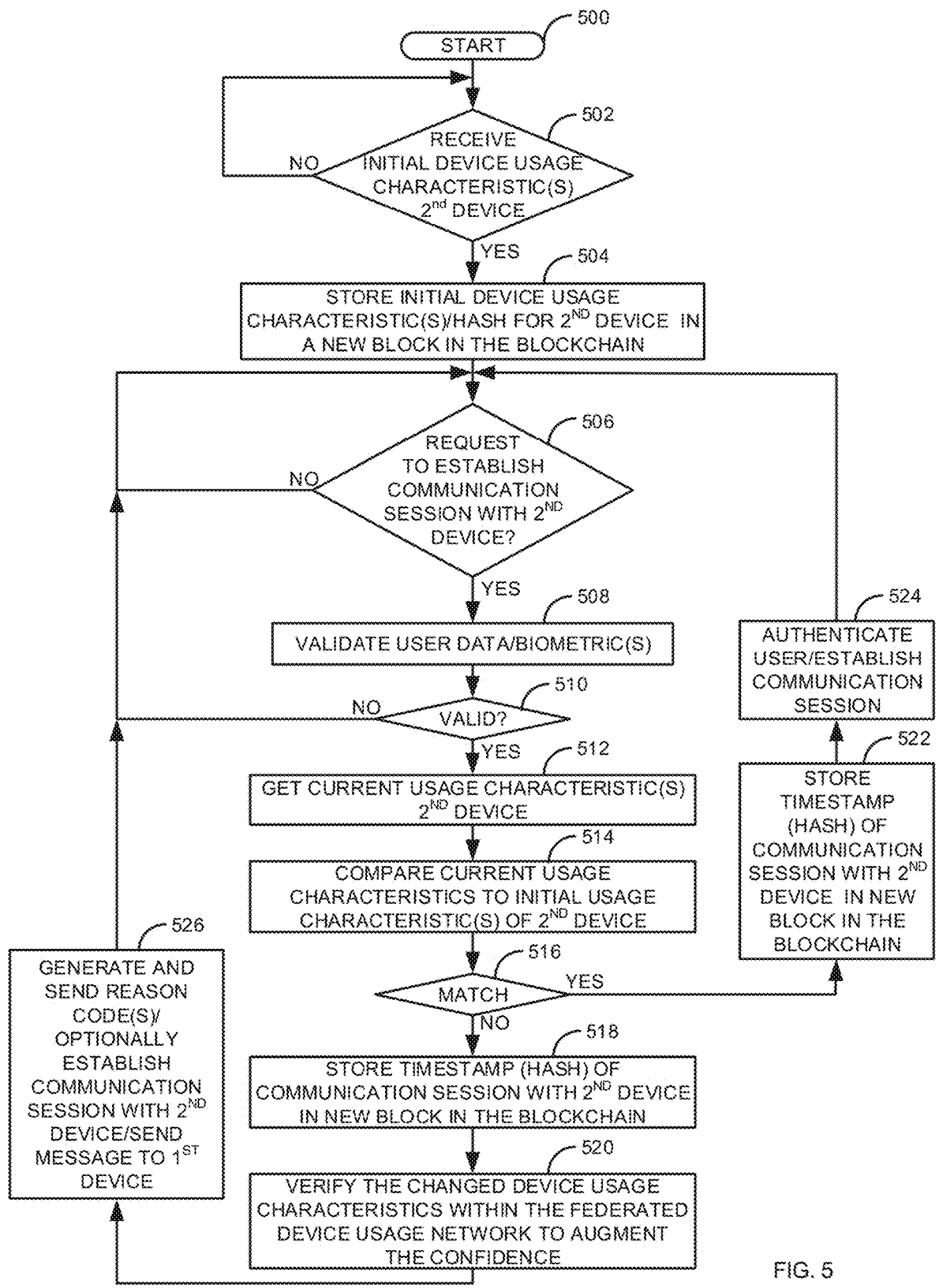
FIG. 5 is a flow diagram of a process for authenticating a user on a second user communication device in a second communication session using authentication metrics and device usage characteristics of the second user communication device.

FIG. 5 is a flow diagram of a process for authenticating a user on a second user communication device 101B in a second communication session using authentication metrics and device usage characteristics 106B/126 of the second user communication device 101B. The process starts in step 500. The blockchain manager 123 waits, in step 502, to receive the initial device usage characteristic(s) 106B from the usage manager 105B in the user communication endpoint 101B. If the initial device usage characteristic(s) 106B are not received in step 502, the process of step 502 repeats. Otherwise, if the initial device usage characteristics 106B are received in step 502, the blockchain manager 123 stores, in step 504, the initial device usage characteristics 106B/hash in the block 201E as described in FIG. 4. Steps 502-504 may also be implemented as a separate thread/process. The device usage characteristics 106B may also be stored in the device usage characteristics 126 (i.e., the device usage characteristics 126 may have a copy of device usage characteristic(s) 106A-106B).

The communication manager 121 waits, in step 506, for a request to establish a communication session. For example, a user of the user communication device 101B may try to establish a video call to a user of the user communication device 101N (e.g., a contact center agent), establish a web session with a web site of an enterprise, and/or the like. Although described for an outgoing call, the request to establish the communication session of step 506 may be for an incoming call to the user communication device 101B. If a request to establish a communication session is not made in step 506, the process of step 506 repeats. Otherwise, if a request to establish a communication session is received in step 506, one or more of the authentication application 104, the third party authentication system 140, and the authentication module 122 validates the user data (e.g., a user name/password) and the biometric(s) (e.g., facial recognition/voiceprint) in step 508. If the user data/biometrics are not valid in step 510, the process goes back to step 506.

Otherwise, if the user data/biometric(s) are valid in step 510, the blockchain manager 123 gets the current device usage characteristics 106B in step 512. For example, the request to establish the communication session of step 506 may include the current device usage characteristic(s) 106B in a SIP INVITE message sent from the user communication device 101B. The blockchain manger 123 compares the initial device usage characteristic(s) (451) or compares hash of the initial device usage characteristic(s) 450 of the blockchain 125 to the current device characteristic(s) 106B/126 or hash of the current device characteristic(s) in step 514.

If there is a match in step 516, the blockchain manager 123 stores, step 522, the time stamp/hash of the communication in the block 201F in the blockchain 125 as discussed in FIG. 4. The user is authenticated in the established communication session in step 524. The process then goes back to step 506 after the communication session completes.

If there is not a match in step 516 the authentication module 122 can calculate an authentic score in a similar manner as described in step 322. The timestamp/hash of the communication session is stored, in step 518, in the block 201F in the blockchain 125 as discussed in FIG. 4.

The changed device usage characteristics 106 are verified (optionally) within the federated device usage network 150 to augment the confidence the user of the communication device 101 in step 520. For example, if the authentic score is a low score, this is propagated to the other user communication devices 101 owned/controlled by the user (e.g., in a message) and verified against the aggregate score of the federated device usage network 150. In other words, there may be a federated device usage network 150 for the user communication devices 101 of a specific user. For example, if the user owns the communication devices 101A-101B, there will be a federated (i.e., a distributed) device usage network 150 that comprises each of the usage monitors 105A-10B/device usage characteristics 106A-106B. A permanent connection can then be used to detect differences between the device usage characteristics 106 between the different user communication devices 101A-101B that are then communicated to the communication system 120 in the form of one or more usage codes and/or reason codes that identify the variances in device usage characteristics.

The usage monitor 105 may also try and establish a communication session with other devices in the federated device usage network 150. If a usage monitor 105 cannot connect to another usage monitor 105, this may be reported in a usage code and/or reason code. This information is used to build an authentic score.

One or more reason codes are generated and sent in step 526. For example, in a similar manner as described in step 330. Based the variances and/or reason codes, the communication session is optionally established in step 526. For example, as described in step 330. The process then goes to step 506.

In one embodiment, in step 526, a message may be sent to the user communication device 101A. For example, the message may indicate that the user communication device 101B may be compromised. The message may also indicate which of the device usage characteristic(s) 106B have a variance.

In one embodiment, the reason code(s) described in FIGS. 3 and 5 may be used to make routing decisions to establish the communication session to at least one of: of a contact center queue, a contact center pool, a chat bot, an Artificial Intelligence (AI) application, an Interactive Voice Response (IVR) system, and/or the like. For example, based on a level of trust, the communication session may be set to a different contact center queue.

The process described in FIGS. 3/6 is where the authentication module 122, the blockchain manager 123, and the device usage characteristics 126 reside in the communication system 120. However, in one embodiment, the authentication module 122, the blockchain manager 123, and device usage characteristics 126 may reside in the third party authentication system 140 instead of the communication system 120. In addition, the third party authentication system 140 also includes a blockchain ledger 124 and a copy of the blockchain(s) 125 that are part of the distributed ledger 127. In this embodiment, the authentication module 122/blockchain manager 123 in the third party authentication system 140 will not only manage user data/biometric data, but also determine if the device usage characteristics 126 match as described in FIGS. 2-6. For example, the user initially tries to establish a session with enterprise either through mobile website or contact center. The user is provided with a challenge to authenticate himself from the enterprise by redirecting to the third party authentication system 140. The user provides a biometric and a password to the third party authentication system 140. An authentication score is generated by the third party authentication system 140 by comparing the biometric/password with a biometric/password stored by the third party authentication system 140. The third party authentication system 140 also compares the current device usage characteristics with the initial device usage characteristics and/or those in the federated device usage network 150. Appropriate Reason codes are generated by third party authentication system 140/and/or the authentication application 104/usage module 105 on the user communication device 101 based on the comparison. The authentication score and reason codes are sent to the communication system 120. If authentication score is good, the enterprise also looks at the reason codes to take critical business decisions.

When a new block is added to the blockchain 125 by the third party authentication system 140, the new block is sent and added to the blockchains 125 in the distributed ledger 127. This information is then conveyed to the communication system 120 (e.g., as raw data or where reason codes are provided). In addition, if the authentication/device usage characteristics are managed by the third party system 140, the third party authentication system 140 generates and sends the reason code(s) to the communication system 120. Alternatively, this may be done on the user communication device 101. The communication system 120 (e.g., a contact center) uses the reason codes to make the necessary decisions to ensure that the user is authentic.

The processes of FIG. 5 are described where the primary processes (e.g., those implemented by the authentication module 122 and the blockchain manager 123) are implemented on the communication system 120 in the network 110. However, in another embodiment, the authentication module 122, the blockchain manager 123, the blockchain ledger 124 may all reside in the user communication device 101B. For example, in a peer-to-peer system.

The reason codes described in FIGS. 3 (step 330) and 5 (step 526) provide a powerful process for detecting fraud in a contact center. For example, if the authentication module 122 assigns an authentic score of 8 (which is good score), the authentication module 122 can also append reason codes that say: "device orientation change detected+ device key pressure change detected+wi-fi change detected". Now, depending on the type of transaction (say the transaction is money transfer from one account to another) the contact center system would be able to escalate the transaction into higher severity and assign that to the fraud department for further handling or the contact center agent may ask further for personally identifiable information to authenticate the user that has initiated the transaction.

In another example, the usage monitor 106 detects that user's location is Los Angeles while placing a first call/interaction and in a two hours difference the same user places another call from New York using a second user communication device 101. In this case the authentic score may be good since all other authentication parameters matched however authentication module 122 would pass the reason code as "location change detected Previous location Los Angeles Current location New York" which would raise a red flag to the fraud department if the call is regarding money transfer or similar critical transaction.

In another example, the user changes device's language and locale settings that include date, time and number format and then initiates an interaction with bank's customer service center. The authentication module 122 module passes reason codes as "Device language change detected+ date, time and number format change detected" which is abnormal behavior since why the user who has been using these setting for a long time suddenly needs to change them. If the reason code is correlated with the transaction which is a money transfer transaction then it raises an alarm because the user initiating the transaction could be a fraudulent user who doesn't properly understand the language and number format settings of actual device owner.

Note that the reason codes also give more flexibility to the contact center system to deny certain transactions at using an Interactive Voice Response (IVR) system or using robot (e.g., a chat bot) and instead of a contact center agent. In this example, the reason codes can help the contact center system hide certain options at the IVR level or deny certain operations at the robot level For instance, the usage monitor 105 detects a change in device orientation and the way in which device is being operated (using only one hand as opposed to two hangs used previously). The authentic score will again be good (e.g., 7) since all other parameters match. When contact center receives the score and reason codes, the contact center checks how critical the transaction is. In this case the transaction is just the query about account balance. However, the robot or IVR doesn't provide the account balance to caller and instead passes the transaction to the contact agent with Yellow notification which is an indication for the contact center agent to proceed with further knowledge based authentication methods. The contact center agent may ask few more questions to the caller to prove personal identity before proceeding with the transaction. In this case, the fraud department may not be involved immediately however the contact center agent is given the latitude to handle it first.

The authentication module 122 and/or authentication application 104 is responsible for passing the authentic score and reason codes to the contact center while the user fulfils the challenge of providing current biometric and reason codes for the device usage characteristics 106 to the enterprise.

In one embodiment the authentication module 122 could also notify the device operating system regarding the authentication score with appended list of the reason codes. Once the device operating system has the knowledge about the binding/authentication score and reason codes, the operating system could interface and pass this information to any other module/app installed on the user communication device 101. For example if the user places a call to bank's contact center from a smartphone, then the operating system would interface with the call module and intercept the call in order to append the information about the binding/authentication score and reason code and pass that information to the called party.

The mechanism could also be extended if the user initiates an interaction with the contact center through other channels such as Facebook, Twitter or even through proprietary financial apps such as Pay™ or the apps provided by the bank, in which case the operating system would also interface with the respective social networking app/financial app and notify it about the score and reason code which would pass it to the appropriate party. On the other end, the called party would receive the authentication score and reason codes generated by the user communication device's authentication module 104 and could handle it in different ways as required.

Figure 6:
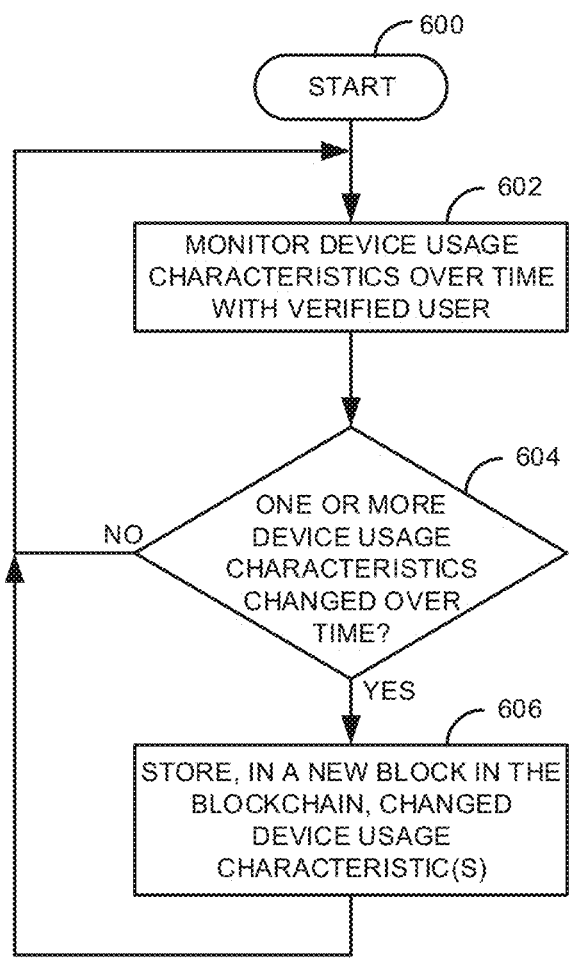
FIG. 6 is a flow diagram of a process for updating device usage characteristics over time.

FIG. 6 is a flow diagram of a process for updating device usage characteristics 106/126 over time. The process starts in step 600. The usage monitor 105 monitors device usage characteristics 106 over time for a verified user in step 602. For example as described above for block 201D, the device usage characteristic 106A may be a swipe text usage that changes as the user becomes more proficient using the swipe text application.

If there are not one or more device usage characteristic(s) that have changed over time in step 604, the process goes back to step 602. Otherwise, if one or more of the device usage characteristics 106A/126 have changed over time in step 602, the updated device characteristics 106A/126 are stored in a new block 201 in the blockchain 125 in step 606. For example, as described above the blocks 201D and 201G are updated based on a change over time. The process then goes back to step 602.

If there is a federated device usage network 150, the changes over time may be broadcast to other network monitors 105 in the federated device usage network 150. This allows the federated device usage network 150 to keep track of changes over time to the device usage characteristics 106 for all the user communication devices 101 of a specific user.

The processes described in FIGS. 1-6 are described where there is a single communication system 120. However, the processes described in FIGS. 1-6 may be used where there are multiple communication systems (e.g., in a large corporate network). In this case, different blockchain managers 123 may be updating a blockchain 125 in the distributed ledger 127.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system comprising:
    a microprocessor; and
    a computer readable medium, coupled with the microprocessor and comprising microprocessor readable and executable instructions that, when executed by the microprocessor, cause the microprocessor to:
    receive a first set of one or more device usage characteristics of a first user interaction using a first user communication device;
    compare the first set of one or more device usage characteristics of the first user interaction using the first user communication device with a second set of one or more device usage characteristics of a second user interaction using the first user communication device stored in a digital ledger; and
    in response to the first set of one or more device usage characteristics not matching the second set of one or more device usage characteristics, generate a first set of one or more reason codes that identifies why the first set of one or more device usage characteristics do not match the second set of one or more device usage characteristics, wherein the first user interaction is between a first user using the first user communication device and a contact center agent and wherein the first set of one or more reason codes is used to send a message to a communication device of the contact center agent to obtain additional information to authenticate the first user.

2. The system of claim 1, wherein the digital ledger comprises a blockchain, wherein the blockchain comprises a third set of one or more device usage characteristics of a third user interaction using a second user communication device, and wherein the second user interaction and the third user interaction are with the first user.

3. The system of claim 2, wherein the microprocessor readable and executable instructions further program the microprocessor to:
    receive a fourth set of one or more device usage characteristics of a fourth user interaction using the second user communication device;
    compare the fourth set of one or more device usage characteristics of the fourth user interaction using the second user communication device with the third set of one or more device usage characteristics of the third user interaction using the second user communication device stored in the blockchain;
    in response to the third set of one or more device usage characteristics not matching the fourth set of one or more device usage characteristics, at least one of:
    send a first message to the first user communication device that indicates that the second user communication device may have become compromised;
    send a second message to the first user communication device that indicates which ones of the third set of one or more device usage characteristics and the fourth set of one or more device usage characteristics do not match; and
    generate a second set of one or more reason codes that identifies why the third set of one or more device usage characteristics and the fourth set of one or more device usage characteristics do not match, wherein the second set of one or more reason codes are used for identifying a level of trust of the first user in a second communication session using the second user communication device.

4. The system of claim 3, wherein in response to the third set of one or more device usage characteristics and the fourth set of one or more device usage characteristics not matching, at least one of the first and second message is sent.

5. The system of claim 3, wherein in response to the third set of one or more device usage characteristics and the fourth set of one or more device usage characteristics not matching, the second set of one or more reason codes that identifies why the third set of one or more device usage characteristics and the fourth set of one or more device usage characteristics do not match is generated.

6. The system of claim 1, wherein the first set of one or more reason codes is further used to route a first communication session to at least one of: of a contact center queue, a contact center pool, a chat bot, an Artificial Intelligence (AI) application, and an Interactive Voice Response (IVR) system.

7. The system of claim 1, wherein the microprocessor readable and executable instructions further program the microprocessor to:
write a timestamp to a new block in the digital ledger that identifies a time associated with the first communication session.

8. The system of claim 1, wherein the first set of one or more device usage characteristics of the first user interaction using the first user communication device comprises at least one of: a preferred hand of the first user, a number of fingers used by the first user in typing, an average key pressure, an average key pressure range, a location, a language setting, a WiFi access point, an install date of an authentication application, an install date of one or more other applications, an application usage parameter, a cadence between keystrokes, an amount of spelling errors, types of emoji used, an average numbers of emoji's used, a swipe text usage, local region settings, a sim card identifier, a location pattern, a web site interaction time, a device angle, a device height from ground, a connection with a smart watch, and a time period of movement of the first user communication device.

9. The system of claim 1, wherein the microprocessor readable and executable instructions further program the microprocessor to:
determine, over time, that the second set of one or more device usage characteristics has changed; and
store at least one of the changed second set of one or more device usage characteristics and a hash of the changed second set of one or more device usage characteristics in a new block in the digital ledger in response to determining, over time, that the second set of one or more device usage characteristics have changed.

10. The system of claim 1, wherein the microprocessor readable and executable instructions further program the microprocessor to:
receive the second set of one or more device usage characteristics of the second user interaction using the first user communication device; and
store the second set of one or more device usage characteristics of the second user interaction using the first user communication device in the digital ledger.

11. The system of claim 1, wherein the microprocessor readable and executable instructions further program the microprocessor to:
determine a federated device usage network that comprises the first user communication device and a second user communication device that is owned or controlled by the first user; and
in response to the first set of one or more device usage characteristics and the second set of one or more device usage characteristics not matching, send a message to the second user communication device that includes the first set of one or more reason codes.

12. A method comprising:
receiving, by a microprocessor, a first set of one or more device usage characteristics of a first user interaction using a first user communication device;
comparing, by the microprocessor, the first set of one or more device usage characteristics of the first user interaction using the first user communication device with a second set of one or more device usage characteristics of a second user interaction using the first user communication device stored in a blockchain; and
in response to the first set of one or more device usage characteristics and the second set of one or more device usage characteristics not matching, generating, by the microprocessor, a first set of one or more reason codes that identifies why the first set of one or more device usage characteristics and the second set of one or more device usage characteristics do not match, wherein the first user interaction is between a first user using the first user communication device and a contact center agent and wherein the first set of one or more reason codes is used to send a message to a communication device of the contact center agent to obtain additional information to authenticate the first user.

13. The method of claim 12, wherein the blockchain comprises a third set of one or more device usage characteristics of a third user interaction using a second user communication device, wherein the second user interaction and the third user interaction are with the first user.

14. The method of claim 13, further comprising:
receiving a fourth set of one or more device usage characteristics of a fourth user interaction using the second user communication device;
comparing the fourth set of one or more device usage characteristics of the fourth user interaction using the second user communication device with the third set of one or more device usage characteristics of the third user interaction using the second user communication device stored in the blockchain;
in response to the third set of one or more device usage characteristics and the fourth set of one or more device usage characteristics not matching, at least one of:
sending a first message to the first user communication device that indicates that the second user communication device may have become compromised;
sending a second message to the first user communication device that indicates which ones of the third set of one or more device usage characteristics and the fourth set of one or more device usage characteristics do not match; and
generating a second set of one or more reason codes that identifies why the third set of one or more device usage characteristics and the fourth set of one or more device usage characteristics do not match, wherein the second set of one or more reason codes are used for identifying a level of trust of the first user in a second communication session using the second user communication device.

15. The method of claim 14, wherein in response to the third set of one or more device usage characteristics and the fourth set of one or more device usage characteristics not matching, at least one of the first and second message is sent.

16. The method of claim 12, wherein the first set of one or more reason codes is further used to route a first communication session to at least one of: of a contact center queue, a contact center pool, a chat bot, an Artificial Intelligence (AI) application, and an Interactive Voice Response (IVR) system.

17. The method of claim 12, wherein the first set of one or more device usage characteristics of the first user interaction using the first user communication device comprises at least one of: a preferred hand of the first user, a number of fingers used by the first user in typing, an average key pressure, an average key pressure range, a location, a language setting, a WiFi access point, an install date of an authentication application, an install date of one or more other applications, an application usage parameter, a cadence between keystrokes, an amount of spelling errors, types of emoji used, an average numbers of emoji's used, a swipe text usage, a local region settings, a sim card identifier, a location pattern, a web site interaction time, a device angle, a device height from ground, a connection with a smart watch, and a time period of movement of the first user communication device.

18. A user communication device comprising:
a microprocessor; and
a computer readable medium, coupled with the microprocessor and comprising microprocessor readable and executable instructions that program the microprocessor to:
capture, a first set of one or more device usage characteristics of a first user interaction wherein the first user interaction is between a user using a user communication device and a contact center agent;
compare the first set of one or more device usage characteristics of the first user interaction using the user communication device with a second set of one or more device usage characteristics of a second user interaction using the user communication device stored in a blockchain;
in response to the first set of one or more device usage characteristics and the second set of one or more device usage characteristics not matching, generate a first set of one or more reason codes that identify why the first set of one or more device usage characteristics and the second set of one or more device usage characteristics do not match; and
use the first set of one or more reason codes to send a message to a communication device of a contact center agent to obtain additional information to authenticate the user.

* * * * *